June 10, 1941.　　M. F. BERGLUND　　2,244,981
SIGNAL CONTROL
Original Filed April 14, 1936　　3 Sheets-Sheet 1
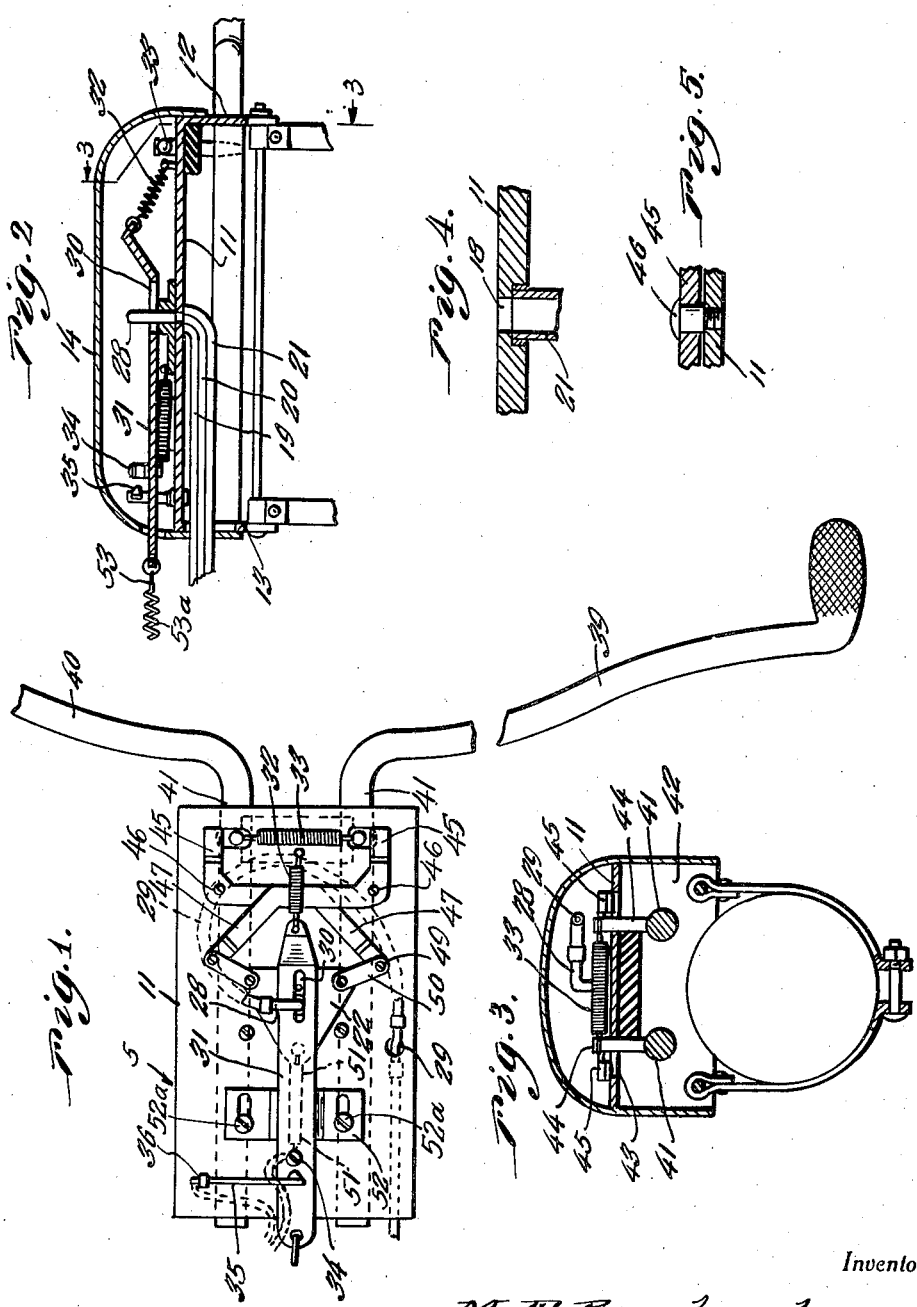
Inventor
M. F. Berglund
By Clarence A. O'Brien and
Hyman Berman
Attorneys June 10, 1941.  M. F. BERGLUND  2,244,981
SIGNAL CONTROL
Original Filed April 14, 1936  3 Sheets-Sheet 2
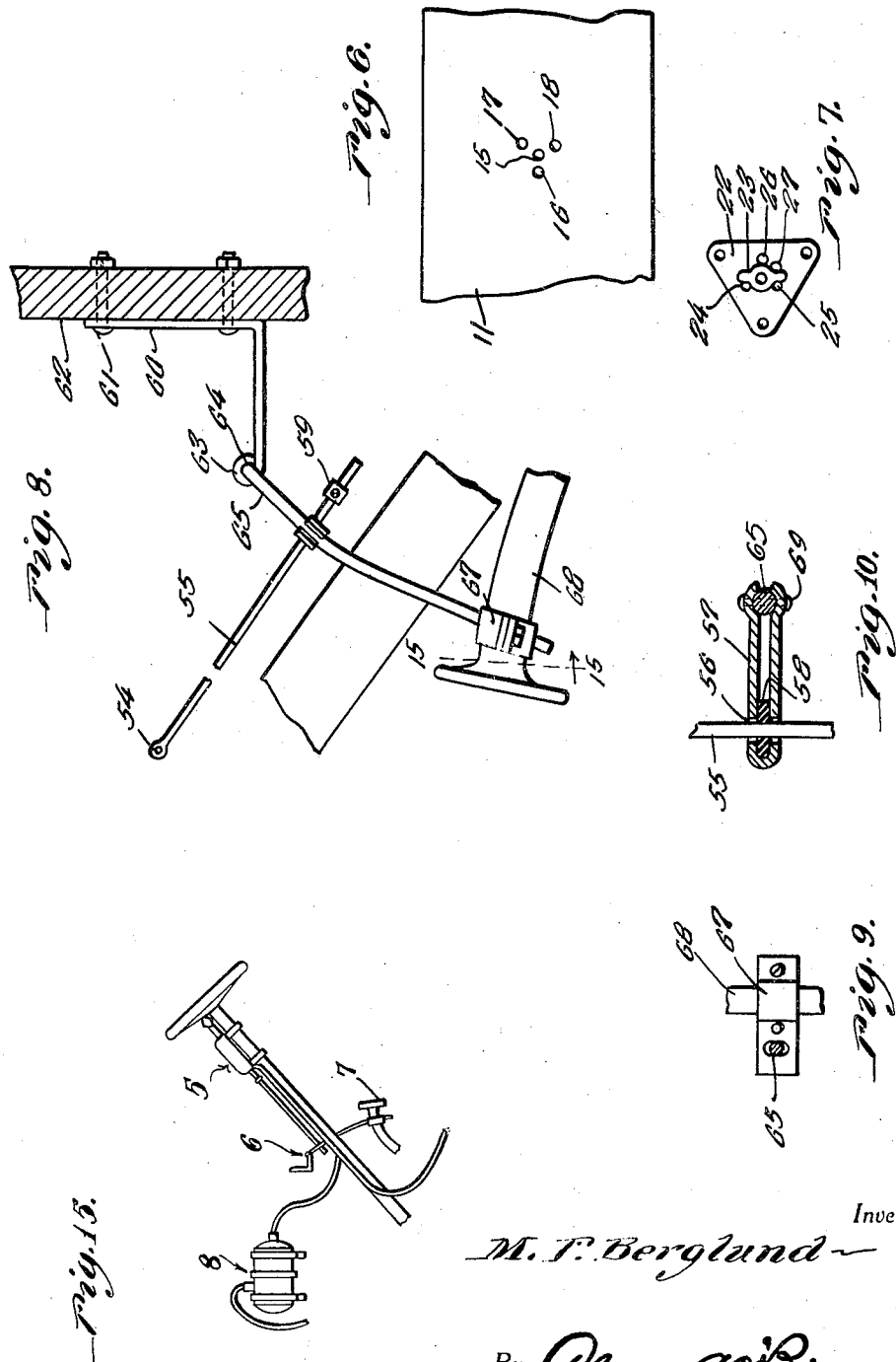
Inventor
M. F. Berglund
By Clarence A. O'Brien and
Hyman Berman
Attorneys June 10, 1941.   M. F. BERGLUND   2,244,981
SIGNAL CONTROL
Original Filed April 14, 1936   3 Sheets-Sheet 3

Inventor

M. F. Berglund

By Clarence A. O'Brien
and Hyman Berman
Attorneys

Patented June 10, 1941

2,244,981

UNITED STATES PATENT OFFICE 2,244,981

SIGNAL CONTROL

Malcolm F. Berglund, Chicago, Ill.

Substituted for abandoned application Serial No. 74,353, April 14, 1936. This application December 8, 1938, Serial No. 244,706

3 Claims. (Cl. 251—56)

This invention appertains to new and useful improvements in direction signal controls for automobiles and any other type of vehicle upon which the same can be employed, and is a substitute for my abandoned application Serial No. 74,353, filed April 14, 1936.

The principal object of the present invention is to provide a signal control whereby, for instance, a semaphore arm can be swung to different positions laterally of an automobile body, to warn other automobile drivers that the vehicle is about to "stop," turn "right" or turn "left."

Another important object of the invention is to provide a mechanism for operating semaphore signals, wherein the suction effect of the automobile engine intake or some other suction effecting means is utilized and efficiently controlled to operate the mechanism in a positive and substantially fool-proof manner.

Other important objects and advantages of the invention will become apparent to the reader of the following specification.

In the drawings:

Figure 1 is a fragmentary top plan view of the suction line controlling mechanism.

Figure 2 is a cross sectional view of the mechanism shown in Figure 1, with the hood in place thereon.

Figure 3 is a cross sectional view on the line 3—3 of Figure 2.

Figure 4 is a fragmentary detailed sectional view, showing how one of the cylinder connecting tubes connects to the control mechanism.

Figure 5 is a fragmentary detailed sectional view of one of the pivotal connections in the mechanism shown in Figure 1.

Figure 6 is a fragmentary top plan view of the apertured plate to which is secured the suction cylinder tubes.

Figure 7 is a top plan view of the shiftable plate, which operates over the opening of the plate shown in Figure 6.

Figure 8 is a fragmentary side elevational view of the mechanism.

Figure 9 is a sectional view on the line 9—9.

Figure 10 is a fragmentary detailed sectional view of the slip connection used in the brake pedal attaching means.

Figure 15 is a diagrammatic view showing the control means mounted on the steering column and in conjunction with the vacuum tank and brake pedal.

Figure 11:
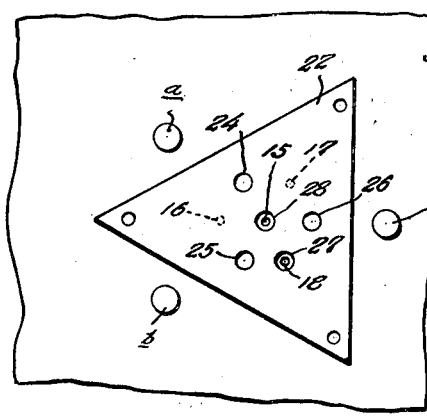
Figure 11 is a diagrammatical view of the valve means in "neutral" position.

Referring to the drawings, wherein like numerals designate like parts, it can be seen that numeral 5 generally refers to control means mounted on a steering column and in operative relation with a brake pedal 7 through connecting means 6 and a vacuum tank 8.

In carrying out the present invention, a description of the control means shown in Figures 1, 2 and 3 will first be given. Referring to Figure 2, it can be seen that this control mechanism consists of a plate 11 having depending end flanges 12—13 over which can be slipped the apron-like wall portions of the hood 14. In this plate 11 is the opening 15 and the openings 16, 17 and 18 into which the tubes 21, 19, 93 and 20 extend, as shown in Figure 4, so any desired fluid responsive type signal can be operated.

Rockably and slidably disposed on the plate 11 is the triangular-shaped plate 22 upon which is located a boss 23. At one side of the boss 23 are the openings 24—25, while at the opposite side of the boss are the openings 26—27. A rigid elbow 28 rises from the boss 23 at a passageway therethrough and a tube 29 extends from this elbow, under the plate 11 and forwardly of the assembly 5, to connect to the nipple 30 of the vacuum tank 8. This elbow 28 rises through the short longitudinally extending slot 30 in the slide plate 31. A spring 32 has one end connected to one end of the plate 31 and the opposite end thereof is anchored to the plate 11, so that normally the plate 31 is retained in the position shown in Figure 1, with the upstanding contact 34 removed from the spring contact finger 35, which finger is anchored and insulated from the plate 11, as at 36.

Numerals 39, 40 represent elongated arms having handles at their outer ends, while their inner ends are provided with shaft-like extensions 41 journaled through the end walls 42 of the plate 11. The plate 11 is provided with short slots 43 therein through which the upstanding lugs 44 on the shaft extensions 41 can extend. An extensible coiled spring 33 connects the upper ends of the pins 44. For each of the arms 39, 40 a link member is employed, the same being in the form of a bell crank 45 suitably pivoted, as at 46 (see Figure 5) to the plate 11, and being provided with a leg extension 47 having an opening 48 in the end thereof which is pivotally connected, as at 49, to one end of a link 50, which in turn is connected to the corresponding corner of the shiftable and slidable plate 22. The remaining corner of the plate 22 is connected to a spring 51 which in turn is anchored to the plate 31 at a point under the contact 34. It can be seen in Figure 1 that suitable guide means 52 is employed for the slide plate 31. The guide means consists of a plate having an arched intermediate portion through which the spring 51 extends, the plate 31 being positively secured to the said arched portion of the plate. Loose connections 52a are provided between the ends of the plate 31 and the plate 11 so that the plate 31 can orient as the slide plate 22 is slid diagonally on the plate 11.

A member 53 extends from the forward end of the slide plate 31 and connects to the eye 54 of the slidable rod 55 (see Figure 8). As shown in Figure 10, this rod 55 extends through the openings 56 in the leg portions of a U-shaped clamp 57. As is shown in Figure 10 and in Figure 9, the openings 56 are actually slots, permitting a certain amount of freedom of the clamp on the rod 55, and a rubber or other resilient friction member 58 is interposed between the legs of the clamp member 57 and surrounds the rod 55, as in the manner shown. An adjustable collar 59 is provided on the rod 55 below the clamp 57. An L-shaped bracket 60 is secured, as at 61, to the usual cowl wall 62 and this has a barrel formation 63 at its lower end in which the laterally disposed end portion 64 of the arm 65 is journaled. This arm depends and passes through the protruding portion 66 of the clamp 67, which embraces the brake pedal 68. This arm 65 passes between the curved end portions 57a and a member 69 passes through these end portions and the arm 65 to fasten these members together.

Figure 13:
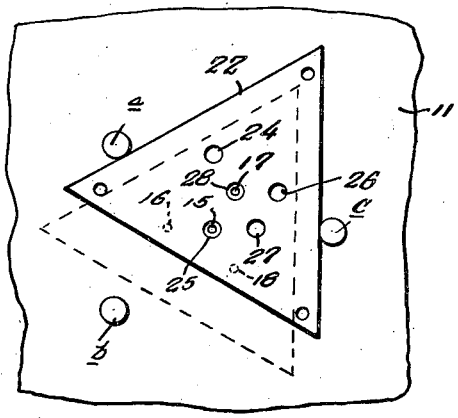
Figure 13 is a diagrammatical view of the valve means in "left" position.

In the operation of this apparatus, let it be assumed that the driver intends to make a left turn and wishes to execute the necessary signal. He presses down on the end of the arm 39 and this rotates the shaft extension 41 through a short arc, moving the pin 44 in an outward direction in the slot 43 (see Figure 3) with the result that the crank member 45 is swung in a manner to shift the valve plate 22 from the neutral position shown in Figures 1 and 11 to the position shown in Figure 13, in full lines. In this latter position the opening 28 which has the suction line 29 disposed therein is communicating with the opening 17 in the plate 11 through which the tube 19 extends. Simultaneously the opening 25 in the valve plate 22 is communicating the opening 15 and the tube extending thereto, namely the tube 21 with the atmosphere.

Figure 14:
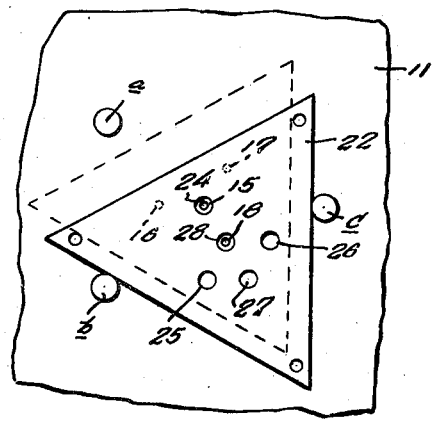
Figure 14 is a diagrammatical view of the valve means in "right" position.

A corresponding action takes place when the lever 40 is pushed down, for when this takes place, the valve plate 22 is moved to the full line position shown in Figure 14, the suction line opening 28 communicating with the plate 11 opening 18 and tube 93.

Whenever the levers 39 and 40 are in neutral position as shown in Figure 11, the opening 28 to which the suction line 29 is communicated is registering with the opening 15 in the plate 11. Simultaneously the opening 27 to the atmosphere is registering with the opening 18. In other words, operation of the signal always starts from neutral position with the valve plate 22 positioned as shown in Figure 11. At this point it will also be observed that to limit the valve plate in these shifting movements, there are provided the stop studs a, b and c. When the valve plate 22 is in neutral position it is centered between the studs as shown in Figure 11. When the valve plate 22 has been shifted to the "left" signaling position it is stopped between the studs a and c, and when the plate is shifted to "right" signaling position, the plate is stopped between the studs b and c.

Figure 12:
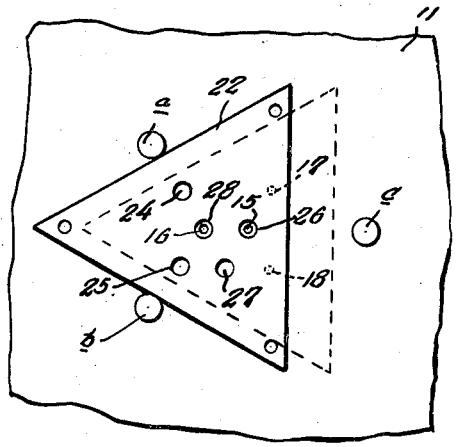
Figure 12 is a diagrammatical view of the valve means in "stop" position.

In the operation of the mechanism to bring the signal to "stop" position, it is necessary to operate the usual foot pedal 68. When the foot pedal is operated, the member 65 is swung downwardly, exerting a pull on the rod 55 which, in turn, exerts a pull on the bar 31. This pulls the bar 31 longitudinally of the plate 11 and moves the valve plate 22 due to the towing action of the spring 51 to the position shown in Figure 12, abutting the studs a and b, thus communicating the suction line 29 by way of the openings 28 and 16 with the tube 20 to the signal (not shown), and at the same time communicating the signal with the atmosphere by way of the tube 21 and openings 15 and 26. It will be observed, that the openings 24, 25, 26 and 27 in the plate 22 are atmosphere openings for permitting air entrance to the signal to prevent the retarding effect of suction, as where pistons are employed. It will be observed in Figure 1 that the spring 32 serves as retracting means for the bar 31 and this in conjunction with the spring 33 serves to restore the mechanism to neutral position as shown in Figure 1, whenever the brake pedal is in brake disengaged position and the levers 40 and 39 are unaffected by pressure.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. A valve for signal structures including a cylinder having a piston therein operatively connected with a signal element; a multiple ported valve, cylinder communicating tubes extending from the valve, said valve being operative to selectively communicate the suction line with the tubes, the valve ends of the tubes being bunched in juxtaposition, said valve including a plate shiftably mounted and having a suction line opening therethrough, said valve plate being in the form of a triangular-shaped plate and a plurality of abutments against which the plate can be shifted to limit movement in bringing the plate to proper position registering the suction line opening with the proper tube.

2. A valve for signal structures including a cylinder having a piston therein operatively connected with a signal element; a multiple ported valve, cylinder communicating tubes extending from the valve, said valve being operative to selectively communicate the suction line with the tubes, the valve ends of the tubes being bunched in juxtaposition, said valve including a plate shiftably mounted and having a suction line opening therethrough, said tubes having their valve ends terminating under the said plate, and manual means for shifting the plate in selecting which one of the tubes the suction line opening is to be communicated with, said manual means including a pair of swingable hand levers and link connecting means between the levers and the plate.

3. A valve for signal structures including a cylinder having a piston therein operatively connected with a signal element; a multiple ported valve, cylinder communicating tubes extending from the valve, said valve being operative to selectively communicate the suction line with the tubes, the valve ends of the tubes being bunched in juxtaposition, said valve including a plate shiftably mounted and having a suction line opening therethrough, said tubes having their valve ends terminating under the said plate, and manual means for shifting the plate in selecting which one of the tubes the suction line opening is to be communicated with, said manual means including a pair of swingable hand levers and link connecting means between the levers and the plate, and stop members for limiting the movement of the plate and between which the plate is adapted to abut.

MALCOLM F. BERGLUND.